(12) United States Patent
Mano et al.

(10) Patent No.: US 11,289,278 B2
(45) Date of Patent: Mar. 29, 2022

(54) POWER STORAGE DEVICE AND METHOD OF MANUFACTURING THE SAME

(71) Applicant: Murata Manufacturing Co., Ltd., Nagaokakyo (JP)

(72) Inventors: Kyotaro Mano, Nagaokakyo (JP); Kenji Kimura, Nagaokakyo (JP); Yasutake Fukuda, Nagaokakyo (JP); Yasuhiko Ueda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 44 days.

(21) Appl. No.: 16/902,377

(22) Filed: Jun. 16, 2020

(65) Prior Publication Data

US 2020/0312577 A1    Oct. 1, 2020

Related U.S. Application Data

(63) Continuation of application No. PCT/JP2018/044219, filed on Nov. 30, 2018.

(30) Foreign Application Priority Data

Jan. 16, 2018    (JP) .............................. JP2018-004962

(51) Int. Cl.
  *H01G 11/28* (2013.01)
  *H01G 11/30* (2013.01)
  (Continued)

(52) U.S. Cl.
  CPC ............ *H01G 11/28* (2013.01); *H01G 11/30* (2013.01); *H01G 11/56* (2013.01); *H01G 11/86* (2013.01)

(58) Field of Classification Search
  None
  See application file for complete search history.

(56) References Cited

U.S. PATENT DOCUMENTS

| 7,285,360 B2 | 10/2007 | Maruyama et al. |
| 7,914,704 B2 | 3/2011 | Yamakawa et al. |

(Continued)

FOREIGN PATENT DOCUMENTS

| CN | 1830044 A | 9/2006 |
| JP | H1131414 A | 2/1999 |

(Continued)

OTHER PUBLICATIONS

International Search Report issued for PCT/JP2018/044219, dated Mar. 5, 2019.

(Continued)

*Primary Examiner* — Dion R. Ferguson
(74) *Attorney, Agent, or Firm* — Arent Fox LLP

(57) ABSTRACT

A power storage device having a positive electrode including a positive electrode current collector and a positive electrode active material layer, a negative electrode including a negative electrode current collector and a negative electrode active material layer, and a separator layer between the positive electrode and the negative electrode and including a gel electrolyte. At least one of the positive electrode active material layer and the negative electrode active material layer includes an electrode active material, an electrolytic solution, a first polymer compound that is not crosslinked, and a binder having a second polymer compound different from the first polymer compound.

19 Claims, 5 Drawing Sheets

(51) Int. Cl.
*H01G 11/56* (2013.01)
*H01G 11/86* (2013.01)

(56) References Cited

U.S. PATENT DOCUMENTS

| | | | |
|---|---|---|---|
| 2004/0197662 A1 | 10/2004 | Maruyama et al. | |
| 2008/0011986 A1 | 1/2008 | Yamakawa et al. | |
| 2012/0120552 A1 | 5/2012 | Ito et al. | |
| 2013/0280579 A1* | 10/2013 | Wright | H01G 11/86 |
| | | | 429/124 |
| 2014/0099528 A1* | 4/2014 | Lockett | H01M 6/164 |
| | | | 429/124 |
| 2014/0349192 A1* | 11/2014 | Park | H01M 10/0413 |
| | | | 429/246 |
| 2018/0254152 A1* | 9/2018 | Matsuo | H01G 11/84 |
| 2020/0091517 A1* | 3/2020 | Yushin | H01M 4/382 |

FOREIGN PATENT DOCUMENTS

| | | | |
|---|---|---|---|
| JP | 2000182902 A | 6/2000 | |
| JP | 2000182903 A * | 6/2000 | ............ H01G 11/56 |
| JP | 2001307716 A | 11/2001 | |
| JP | 2003123842 A | 4/2003 | |
| JP | 2011035205 A | 2/2011 | |
| JP | 2016167403 A | 9/2016 | |
| WO | 2017057603 A1 | 4/2017 | |

OTHER PUBLICATIONS

Written Opinion of the International Searching Authority issued for PCT/JP2018/044219, dated Mar. 5, 2019.

* cited by examiner

POWER STORAGE DEVICE AND METHOD OF MANUFACTURING THE SAME

CROSS REFERENCE TO RELATED APPLICATIONS

The present application is a continuation of International application No. PCT/JP2018/044219, filed Nov. 30, 2018, which claims priority to Japanese Patent Application No. 2018-004962, filed Jan. 16, 2018, the entire contents of each of which are incorporated herein by reference.

FIELD OF THE INVENTION

The present invention relates to a power storage device and a method of manufacturing the same.

BACKGROUND OF THE INVENTION

A known power storage device has a configuration in which a separator is provided between a positive electrode and a negative electrode.

As one of such power storage devices, Patent Document 1 discloses an electric double layer capacitor provided with a polarizable electrode including a gel polymer compound including an electrolytic solution. Further, Patent Document 2 discloses an electrochemical capacitor provided with an electrode including an ionic liquid and a gel polymer compound.

Patent Document 1: Japanese Patent Application Laid-Open No. 2000-182903

Patent Document 2: Japanese Patent Application Laid-Open No. 2011-35205

SUMMARY OF THE INVENTION

In the power storage devices disclosed in Patent Documents 1 and 2 described above, a viscosity of the electrolytic solution in the electrode and a viscosity of the electrolytic solution in the separator are substantially the same. Thus, when water intrudes into the power storage device, the intruding water is dispersed not only in the separator but also in the electrode. This may degrade the characteristics of the power storage device.

The present invention has been made to solve the above problem, and an object of the present invention is to provide a power storage device capable of suppressing intrusion of water into an electrode when water has intruded inside the power storage device, and a method of manufacturing such a power storage device.

A power storage device of the present invention includes a positive electrode including a positive electrode current collector and a positive electrode active material layer, a negative electrode including a negative electrode current collector and a negative electrode active material layer, and a separator layer between the positive electrode and the negative electrode and including a gel electrolyte. At least one of the positive electrode active material layer and the negative electrode active material layer includes an electrode active material, an electrolytic solution, a first polymer compound that is not crosslinked, and a binder having a second polymer compound different from the first polymer compound.

The positive electrode active material layer and the negative electrode active material layer may each include activated carbon.

In the above power storage device, the positive electrode active material layer and the negative electrode active material layer that includes the first polymer compound that is not crosslinked may also include a crosslinking initiator.

Further, the positive electrode active material layer and the negative electrode active material layer may be configured not to include a crosslinking initiator.

A method of manufacturing a power storage device according to one aspect of the present invention includes: forming a first active material layer including a positive electrode active material and a binder on a positive electrode current collector; forming a second active material layer including a negative electrode active material and the binder on a negative electrode current collector; applying a paste onto at least one of the first active material layer and the second active material layer, the paste including an electrolytic solution, a crosslinking initiator, and a first polymer compound that is not crosslinked; forming a gel electrolyte layer by crosslinking the polymer compound included in the paste layer; and interposing the gel electrolyte layer between the first active material layer and the second active material layer, wherein the first polymer compound is different from a second polymer compound included in the binder.

A method of manufacturing a power storage device according to another aspect of the present invention includes: forming a first active material layer including a positive electrode active material and a binder on a positive electrode current collector; forming a second active material layer including a negative electrode active material and the binder on a negative electrode current collector; applying a paste onto at least one of the first active material layer and the second active material layer, the paste including an electrolytic solution, a crosslinking initiator, and a first polymer compound that is not crosslinked; forming a gel electrolyte layer by crosslinking the first polymer compound included in the paste layer; and interposing the gel electrolyte layer between the first active material layer and the second active material layer, wherein, of the at least one of the first active material layer and the second active material layer onto which the paste is applied, that active material layer further includes an electrolytic solution and a third polymer compound that is not crosslinked, and the first polymer compound is different from a second polymer compound included in the binder.

The third polymer compound may be a material identical to the first polymer compound.

In the step of forming the gel electrolyte layer, the first polymer compound may be crosslinked by irradiating with ultraviolet rays.

The positive electrode active material and the negative electrode active material may include activated carbon.

A content of the first polymer compound included in the paste may be equal to or less than 10% by weight of the paste.

According to the power storage device of the present invention, since at least one of the positive electrode active material layer and the negative electrode active material layer has a polymer compound dissolved therein, and the polymer compound is cross-linked in the separator layer, a viscosity of the electrolytic solution in the at least one of the active material layers is higher than a viscosity of the electrolytic solution in the separator layer. As a result, a diffusion rate of water in the at least one of the active material layers is lower than a diffusion rate of water in the separator layer. Thus, when water intrudes into the power storage device, the water intrusion into the positive electrode and the negative electrode can be suppressed.

Further, according to the method of manufacturing a power storage device in one aspect of the present invention, at least one of the positive electrode active material layer and the negative electrode active material layer, and the separator layer can be prepared simultaneously. The power storage device can be therefore manufactured efficiently.

Further, according to the method of manufacturing a power storage device in another aspect of the present invention, a power storage device in which the active material layer does not include the crosslinking initiator can be manufactured. Since the crosslinking initiator included in the active material layer is an impurity, a configuration of including non-crosslinking initiator can improve reliability of the power storage device.

DETAILED DESCRIPTION OF THE INVENTION

Hereinafter, embodiments of the present invention will be shown to specifically describe features of the present invention.

Hereinafter, an electric double layer capacitor will be described as an example of a power storage device, but the power storage device is not limited to the electric double layer capacitor.

First Embodiment

Figure 1:
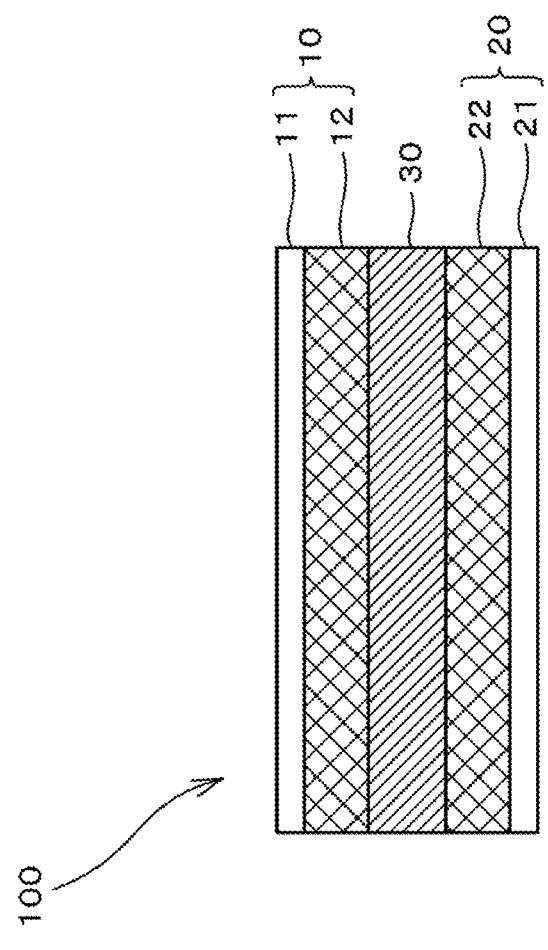
FIG. 1 is a sectional view illustrating a configuration of a power storage device according to a first embodiment.

FIG. 1 is a sectional view illustrating a configuration of a power storage device 100 according to a first embodiment. The power storage device 100 according to the first embodiment includes a positive electrode 10, a negative electrode 20, and a separator layer 30.

The positive electrode 10 includes a positive electrode current collector 11 and a positive electrode active material layer 12. As the positive electrode current collector 11, for example, aluminum can be used.

The positive electrode active material layer 12 is formed on one main surface of the positive electrode current collector 11, and includes activated carbon as a positive electrode active material, an electrolytic solution, a first polymer compound that is not crosslinked, a binder, and a crosslinking initiator.

The binder includes a second polymer compound. As the second polymer compound, for example, carboxymethyl cellulose (CMC) can be used. Further, as the crosslinking initiator, for example, a phenyl derivative can be used.

The first polymer compound that is not crosslinked is a polymer compound different from the second polymer compound included in the binder, and is dissolved in the electrolytic solution. In the present embodiment, the positive electrode active material layer 12 includes, as the first polymer compound, a polymer compound that is crosslinked by irradiation with ultraviolet rays or by heat, but is present in a non-crosslinked state. As such a polymer compound, for example, polyethylene oxide is used.

The first polymer compound and the second polymer compound can be distinguished by, for example, analyzing compositions.

As the electrolytic solution, for example, an ionic liquid such as 1-ethyl-3-methylimidazolium bisimide (EMI-TFSI) can be used.

The negative electrode 20 includes a negative electrode current collector 21 and a negative electrode active material layer 22. As the negative electrode current collector 21, for example, aluminum can be used. A configuration of the negative electrode active material layer 22 is the same as a configuration of the positive electrode active material layer 12.

The separator layer 30 is provided to prevent a short circuit between the positive electrode 10 and the negative electrode 20, and includes a gel electrolyte. Specifically, the gel electrolyte interposed between the positive electrode 10 and the negative electrode 20 functions as the separator layer 30. The gel electrolyte includes a first polymer compound that is crosslinked, for example, polyethylene oxide that is crosslinked.

In the power storage device 100 according to the present embodiment, since the first polymer compound that is not crosslinked is dissolved in the electrolytic solution included in the positive electrode 10 and the negative electrode 20, a viscosity of the electrolytic solution included in the positive electrode 10 and the negative electrode 20 is higher than a viscosity of the electrolytic solution in the separator layer 30. In this case, a diffusion rate of water in the active material layers of the positive electrode 10 and the negative electrode 20 is lower than a diffusion rate of water in the separator layer 30.

Therefore, when moisture intrudes into the power storage device 100, a difference in the diffusion rate of water makes it difficult for moisture to intrude into the positive electrode 10 and the negative electrode 20, thereby preventing water intrusion into the positive electrode 10 and the negative electrode 20.

(Method of Manufacturing Power Storage Device)

A method of manufacturing the power storage device 100 will be described.

First, a method of manufacturing the positive electrode 10 and a portion located on a positive electrode side of the separator layer 30 will be described.

Figure 2A:
FIGS. 2(a) to 2(c) are diagrams for describing a method of manufacturing a positive electrode and a portion located on a positive electrode side of a separator layer.
Figure 2A:
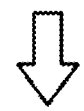

A material obtained by mixing a positive electrode active material and a binder is applied onto an aluminum foil configuring the positive electrode current collector 11 to form a first active material layer 12A (see FIG. 2(a)). Here, description will be made on the assumption that activated carbon is used as the positive electrode active material. A thickness of the first active material layer 12A is, for example, equal to or more than 5 μm and equal to or less than 15 μm.

Next, a paste including the electrolytic solution, the first polymer compound that is not crosslinked, and the crosslinking initiator is created. The first polymer compound is different from the second polymer compound included in the binder, and here, description will be made assuming that polyethylene oxide is used as the first polymer compound. A content of polyethylene oxide included in the paste is equal to or less than 10% by weight of the paste. By setting the content of polyethylene oxide included in the paste to equal to or less than 10% by weight of the paste, ion conduction in the electrolytic solution included in the positive electrode active material layer 12 is ensured, and a low-resistance power storage device can be manufactured. This paste is a gel precursor that becomes a gel polymer compound when polyethylene oxide is crosslinked.

A paste prepared in advance may be used instead of a paste freshly created.

Figure 2B:
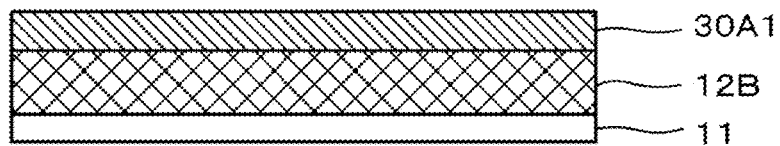
Figure 2B:
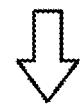

Next, the paste is applied onto the first active material layer 12A. The applied paste permeates the first active material layer 12A. Here, a reference symbol 12B is assigned to the first active material layer that the paste has permeated to distinguish the first active material layer 12B from the first active material layer 12A before the paste has permeated. A first paste layer 30A1 is formed on the first active material layer 12B that the paste has permeated (see FIG. 2(b)). A thickness of the first paste layer 30A1 is, for example, equal to or more than 5 µm and equal to or less than 50 µm.

Figure 2C:
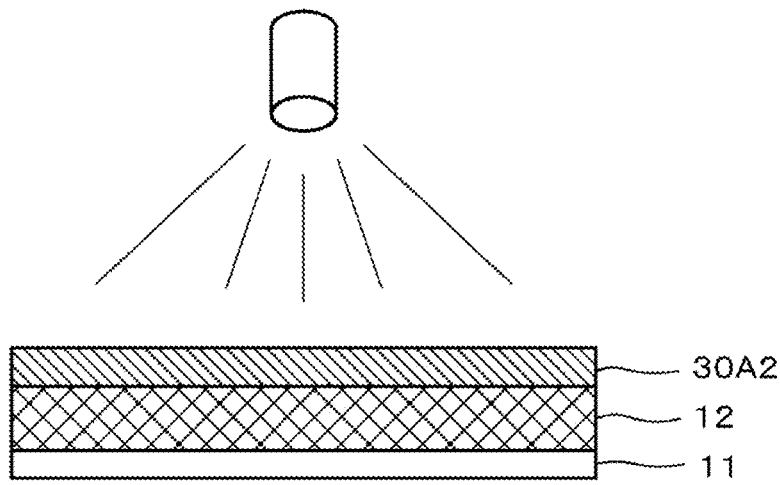

Next, a surface of the first paste layer 30A1 is irradiated with ultraviolet rays to crosslink the polyethylene oxide included in the first paste layer 30A1 to form a first gel electrolyte layer 30A2 (see FIG. 2(c)).

At this time, since the first active material layer 12B that the paste has permeated includes activated carbon, the ultraviolet rays are blocked by the activated carbon and cannot reach the inside of the first active material layer 12B. Thus, the polyethylene oxide included in the first active material layer 12B is not crosslinked and remains in a paste state in the first active material layer 12B. As a result, the positive electrode active material layer 12 including the activated carbon, the electrolytic solution, the polyethylene oxide that is not crosslinked, the binder, and the crosslinking initiator is formed.

Note that although the polyethylene oxide included in the first active material layer 12B is not crosslinked for the reasons described above, the polyethylene oxide present on the first paste layer 30A1 side is actually crosslinked by irradiation with ultraviolet rays.

As described above, in the present embodiment, the first polymer compound included in the paste is gelled by chemical crosslinking, which is easier to control than physical crosslinking for gelling. Note that a paste including the first polymer compound that is not crosslinked cannot be prepared using a physically crosslinked gel such as PVdF.

Next, a method of creating the negative electrode 20 and a portion of the separator layer 30 located on the negative electrode side will be described. Since the method of manufacturing the negative electrode 20 is the same as the method of manufacturing the positive electrode 10, a brief description will be given below.

Figure 3A:
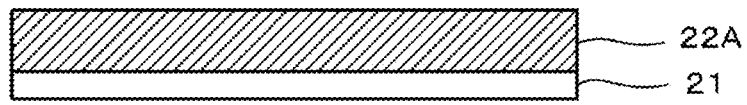
FIGS. 3(a) to 3(c) are diagrams for describing a method of manufacturing a negative electrode and a portion located on a negative electrode side of the separator layer.

A material obtained by mixing a negative electrode active material and a binder is applied onto an aluminum foil configuring the negative electrode current collector 21 to form a second active material layer 22A (see FIG. 3(a)). Here, description will be made on the assumption that activated carbon is used as the negative electrode active material.

Figure 3B:
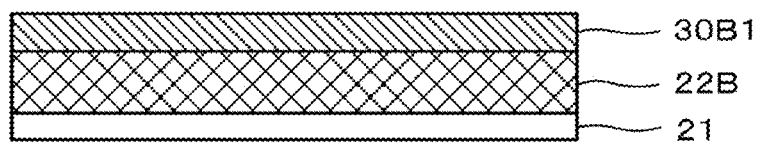

Next, the paste created at the time of preparing the positive electrode 10 is applied onto the second active material layer 22A. As described above, the paste to be applied may be prepared in advance. The applied paste permeates the second active material layer 22A. Here, a reference symbol 22B is assigned to the second active material layer that the paste has permeated to distinguish the second active material layer 22B from the second active material layer 22A before the paste has permeated. A second paste layer 30B1 is formed on the second active material layer 22B that the paste has penetrated (see FIG. 3(b)).

Figure 3C:
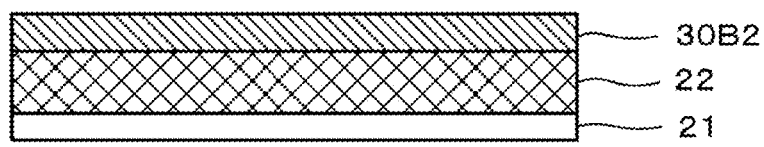

Next, a surface of the second paste layer 30B1 is irradiated with ultraviolet rays to crosslink the polyethylene oxide included in the second paste layer 30B1 to form a second gel electrolyte layer 30B2 (see FIG. 3(c)).

At this time, since the second active material layer 22B that the paste has permeated includes activated carbon, the ultraviolet rays are blocked by the activated carbon and cannot reach the inside of the second active material layer 22B. Thus, the polyethylene oxide contained in the second active material layer 22B is not crosslinked and remains in a paste state in the second active material layer 22B. As a result, the negative electrode active material layer 22 including the activated carbon, the electrolytic solution, the polyethylene oxide that is not crosslinked, the binder, and the crosslinking initiator is formed.

Figure 4:
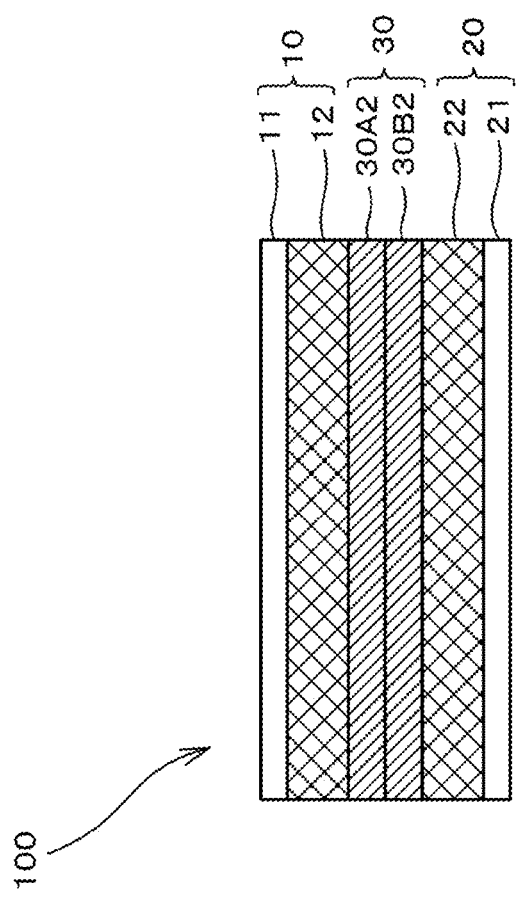
FIG. 4 is a sectional view illustrating a configuration of a manufactured power storage device.
Figure 5A:
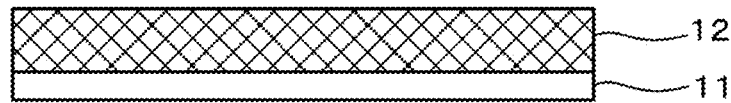
FIGS. 5(a) to 5(c) are diagrams for describing a method of manufacturing a positive electrode and a portion located on the positive electrode side of a separator layer in a method of manufacturing a power storage device according to a second embodiment.
Figure 5A:
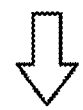
Figure 5B:
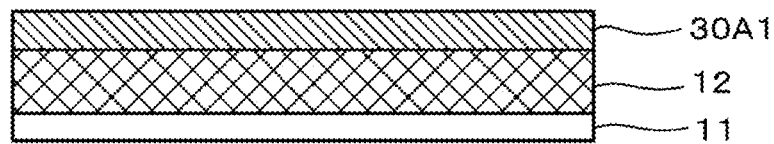
Figure 5B:
Figure 5C:
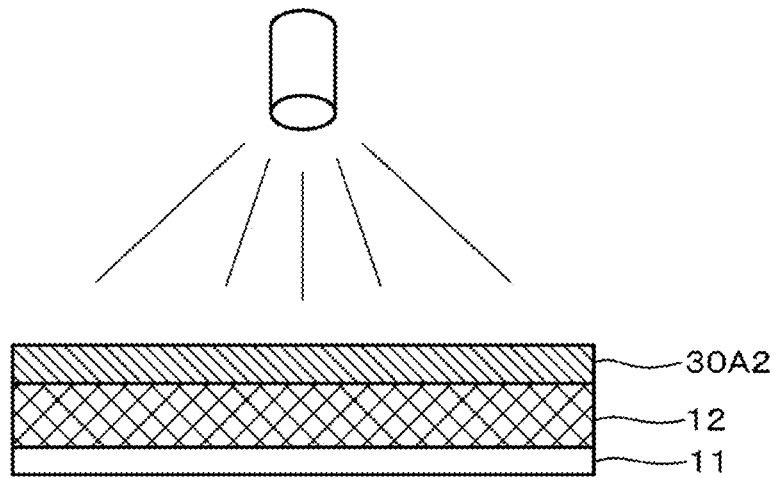

Finally, the first gel electrolyte layer 30A2 and the second gel electrolyte layer 30B2 are brought into contact with each other such that the first gel electrolyte layer 30A2 and the second gel electrolyte layer 30B2 are interposed between the positive electrode current collector 11 and the negative electrode current collector 21 (see FIG. 4). The first gel electrolyte layer 30A2 and the second gel electrolyte layer 30B2 configure the separator layer 30 shown in FIG. 1.

According to the method of manufacturing the power storage device described above, by irradiating ultraviolet rays, the positive electrode active material layer 12 and a part of the separator layer 30 (first gel electrolyte layer 30A2), and the negative electrode active material layer 22 and a part of the separator layer 30 (second gel electrolyte layer 30B2) can be simultaneously prepared. Thus, the power storage device 100 can be efficiently manufactured.

In the present embodiment, the composition of the first polymer compound included in the positive electrode active material layer 12 and the negative electrode active material layer 22 and the composition of the first polymer compound included in the separator layer 30 are the same. Hereinafter, a method of determining presence or absence of crosslinking between the first polymer compound included in the positive electrode active material layer 12 and the first polymer compound included in the separator layer 30 both of which have the same composition will be described. The same applies to a method of determining presence or absence of crosslinking of the first polymer compound included in the negative electrode active material layer 22 and the first polymer compound included in the separator layer 30.

First, the compositions of the first polymer compound included in the positive electrode active material layer 12 and the first polymer compound included in the separator layer 30 are analyzed by, for example, Fourier transform infrared spectroscopy (FT-IR) to distinguish the second polymer compound as the binder from the first polymer compound as the gel precursor.

Next, the electrolytic solution in the power storage device is washed away with a solvent that does not dissolve the polymer compound that is crosslinked but dissolves the polymer compound that is not crosslinked. For example, acetone can be used as the solvent that does not dissolve the polymer compound that is crosslinked but dissolves the polymer compound that is not crosslinked.

After the electrolytic solution is washed away, a section inside the power storage device is observed to check presence or absence of an organic solid residue. That is, the polymer compound that is crosslinked remains as an organic solid residue, but the polymer compound that is not crosslinked is washed away by the solvent and does not remain. As a result, in a case of the power storage device 100 according to the present embodiment, the positive electrode active material layer has no organic solid residue, but the separator layer 30 has an organic solid residue.

Second Embodiment

In the power storage device 100 according to the first embodiment, the positive electrode active material layer 12 and the negative electrode active material layer 22 include a crosslinking initiator. Thus, by irradiating the ultraviolet rays, the positive electrode 10 and a part of the separator layer 30 can be simultaneously manufactured, and the negative electrode 20 and a part of the separator layer 30 can be simultaneously prepared.

On the other hand, in the power storage device 100 according to a second embodiment, the positive electrode active material layer 12 and the negative electrode active material layer 22 do not include the crosslinking initiator.

A method of manufacturing the power storage device 100 according to the second embodiment will be briefly described below.

First, a material obtained by mixing a positive electrode active material, a binder, an electrolytic solution, and a third polymer compound that is not crosslinked is applied onto an aluminum foil configuring the positive electrode current collector 11 to form the positive electrode active material layer 12 (see FIG. 5(*a*)). Here, description is given on the assumption that activated carbon is used as the positive electrode active material and polyethylene oxide is used as the third polymer compound.

Next, a paste including the electrolytic solution, the first polymer compound that is not crosslinked, and the crosslinking initiator is created. The first polymer compound is different from the second polymer compound included in the binder, and here, description will be made assuming that polyethylene oxide is used. A content of polyethylene oxide included in the paste is equal to or less than 10% by weight of the paste. This paste is a gel precursor that becomes a gel polymer compound when polyethylene oxide is crosslinked.

Note that, similarly to the first embodiment, a paste prepared in advance may be used instead of a paste freshly created.

Next, the paste is applied onto the positive electrode active material layer 12. Thus, the first paste layer 30A1 is formed on the positive electrode active material layer 12 (see FIG. 5(*b*)). Note that since the positive electrode active material layer 12 includes the electrolytic solution, the paste does not permeate the positive electrode active material layer 12.

Next, a surface of the first paste layer 30A1 is irradiated with ultraviolet rays to crosslink the polyethylene oxide included in the first paste layer 30A1 to form a first gel electrolyte layer 30A2 (see FIG. 5(*c*)). Since the crosslinking initiator is not included in the positive electrode active material layer 12, the polyethylene oxide in the positive electrode active material layer 12 does not crosslink.

Similarly, on the negative electrode side, the negative electrode active material layer 22 is formed on the aluminum foil configuring the negative electrode current collector 21, and the second gel electrolyte layer is formed on the negative electrode active material layer 22. Then, the first gel electrolyte layer and the second gel electrolyte layer are brought into contact with each other such that the first gel electrolyte layer and the second gel electrolyte layer are interposed between the positive electrode current collector 11 and the negative electrode current collector 21. The first gel electrolyte layer and the second gel electrolyte layer configure the separator layer 30 shown in FIG. 1.

In the power storage device 100 according to the second embodiment, the positive electrode active material layer 12 and the negative electrode active material layer 22 can be configured to include no crosslinking initiator. Since the crosslinking initiator included in the active material layer is an impurity, the configuration of including no crosslinking initiator can improve reliability of the power storage device 100.

Further, in a manufacturing process of the power storage device 100, the positive electrode active material layer and the negative electrode active material layer do not include the crosslinking initiator. Thus, when a method of crosslinking by heating is adopted instead of irradiating ultraviolet rays, it is possible to prevent crosslinking of the third polymer compound included in the positive electrode active material layer and the negative electrode active material layer.

The present invention is not limited to the above embodiments, and various applications and modifications can be made within the scope of the present invention.

For example, in the above embodiment, in the manufacturing process of the power storage device, it has been described that the first polymer compound is crosslinked by irradiating ultraviolet rays. Alternatively, the method of crosslinking the first polymer compound by heating may be adopted.

In the method of manufacturing the power storage device 100 according to the second embodiment, the description has been made assuming that the same polymer compound as the first polymer compound included in the paste is used as the third polymer compound included in the positive electrode active material layer 12 and the negative electrode active material layer 22. Alternatively, a polymer compound different from the first polymer compound may be used as the third polymer compound. Using the same polymer compound allows a low-cost manufacture without increasing kinds of materials.

Further, the power storage device having the above configuration may be manufactured by a manufacturing method other than the manufacturing method described in the above embodiment.

In the above embodiment, the description has been given assuming that each of the positive electrode active material layer and the negative electrode active material layer includes the electrode active material, the binder, the electrolytic solution, and the first polymer compound that is a polymer compound that is not crosslinked and is different from the second polymer compound included in the binder.

However, one of the positive electrode active material layer and the negative electrode active material layer may be configured to include the electrode active material, the binder, the electrolytic solution, and the first polymer compound that is a polymer compound that is not crosslinked and is different from the second polymer compound included in the binder. In this case, the other one of the positive electrode active material layer and the negative electrode active material layer includes the binder and the electrolytic solution. The power storage device having such a configuration can suppress the intrusion of water into the electrode including the first polymer compound that is not crosslinked when water intrudes inside.

Further, in the above configuration, that is, a configuration including the first polymer compound in which one of the positive electrode active material layer and the negative electrode active material layer is not crosslinked, only one of the active material layers may be configured to include the crosslinking initiator.

However, as in the above embodiment, by a configuration including each of the positive electrode active material layer and the negative electrode active material layer includes the electrode active material, the binder, the electrolytic solution, and the first polymer compound that is not crosslinked, the intrusion of water into the positive electrode and the negative electrode can be suppressed, and thus this configuration is preferable.

DESCRIPTION OF REFERENCE SYMBOLS

10: Positive electrode
11: Positive electrode current collector
12: Positive electrode active material layer
12A: First active material layer before paste has permeated
12B: First active material layer that paste has permeated
20: Negative electrode
21: Negative electrode current collector
22: Negative electrode active material layer
22A: Second active material layer before paste has permeated
22B: Second active material layer that paste has permeated
30: Separator
30A1: First paste layer
30A2: First gel electrolyte layer
30B1: Second paste layer
30B2: Second gel electrolyte layer
100: Power storage device

The invention claimed is:

1. A power storage device comprising:
a positive electrode including a positive electrode current collector and a positive electrode active material layer;
a negative electrode including a negative electrode current collector and a negative electrode active material layer; and
a separator layer between the positive electrode and the negative electrode and including a gel electrolyte,
wherein at least one of the positive electrode active material layer and the negative electrode active material layer includes an electrode active material, an electrolytic solution, a first polymer compound that is not crosslinked, and a binder having a second polymer compound different from the first polymer compound, and
wherein the positive electrode active material layer and the negative electrode active material layer that includes the first polymer compound also includes a crosslinking initiator.

2. The power storage device according to claim 1, wherein the second polymer compound is carboxymethyl cellulose.

3. The power storage device according to claim 1, wherein the first polymer compound is dissolved in the electrolytic solution.

4. The power storage device according to claim 1, wherein the first polymer compound is polyethylene oxide.

5. The power storage device according to claim 1, wherein the positive electrode active material layer and the negative electrode active material layer each include activated carbon.

6. The power storage device according to claim 1, wherein the crosslinking initiator is a phenyl derivative.

7. The power storage device according to claim 1, wherein the gel electrolyte includes the first polymer compound in a crosslinked state.

8. A power storage device comprising:
a positive electrode including a positive electrode current collector and a positive electrode active material layer;
a negative electrode including a negative electrode current collector and a negative electrode active material layer; and
a separator layer between the positive electrode and the negative electrode and including a gel electrolyte,
wherein at least one of the positive electrode active material layer and the negative electrode active material layer includes an electrode active material, an electrolytic solution, a first polymer compound that is not crosslinked, and a binder having a second polymer compound different from the first polymer compound, and
wherein the positive electrode active material layer and the negative electrode active material layer do not include a crosslinking initiator.

9. The power storage device according to claim 8, wherein the second polymer compound is carboxymethyl cellulose.

10. The power storage device according to claim 8, wherein the first polymer compound is dissolved in the electrolytic solution.

11. The power storage device according to claim 8, wherein the first polymer compound is polyethylene oxide.

12. The power storage device according to claim 8, wherein the positive electrode active material layer and the negative electrode active material layer each include activated carbon.

13. The power storage device according to claim 8, wherein the gel electrolyte includes the first polymer compound in a crosslinked state.

14. A method of manufacturing a power storage device, the method comprising:
forming a first active material layer including a positive electrode active material and a binder on a positive electrode current collector;
forming a second active material layer including a negative electrode active material and the binder on a negative electrode current collector;
applying a paste onto at least one of the first active material layer and the second active material layer, the paste including an electrolytic solution, a crosslinking initiator, and a first polymer compound that is not crosslinked; and
forming a gel electrolyte layer by crosslinking the first polymer compound included in the paste layer; and
interposing the gel electrolyte layer between the first active material layer and the second active material layer,
wherein of the at least one of the first active material layer and the second active material layer onto which the paste is applied, that active material layer further includes an electrolytic solution and a third polymer compound that is not crosslinked, and
the first polymer compound is different from a second polymer compound included in the binder.

15. The method of manufacturing a power storage device according to claim 14, wherein the third polymer compound is a material identical to the first polymer compound.

16. The method of manufacturing a power storage device according to claim 14, wherein the first polymer compound is crosslinked by irradiating with ultraviolet rays when forming the gel electrolyte layer.

17. The method of manufacturing a power storage device according to claim 14, wherein the positive electrode active material and the negative electrode active material both include activated carbon.

18. The method of manufacturing a power storage device according to claim 14, wherein a content of the first polymer compound included in the paste is equal to or less than 10% by weight of the paste.

19. The method of manufacturing a power storage device according to claim 14, wherein the first polymer compound is polyethylene oxide.

* * * * *